United States Patent [19]

Sliger

[11] 4,029,074

[45] June 14, 1977

[54] FUEL VALVES

[75] Inventor: Boyd Paul Sliger, Concord, Tenn.

[73] Assignee: Robertshaw Controls Company, Richmond, Va.

[22] Filed: Dec. 4, 1975

[21] Appl. No.: 637,497

[52] U.S. Cl. .................... 123/198 D; 123/142; 123/97 R; 137/468; 123/41.15
[51] Int. Cl.² .................................. F02B 77/08
[58] Field of Search .... 123/198 D, 198 DB, 198 R, 123/97 R, 142, 41.15; 137/457, 468

[56] References Cited

UNITED STATES PATENTS

| 1,907,351 | 5/1933 | King et al. ............... 123/198 D |
| 2,112,664 | 3/1938 | Dube ....................... 123/198 DB |
| 2,131,811 | 10/1938 | Kittredge ................. 123/198 DB |
| 3,153,403 | 10/1964 | Dobbs ..................... 123/198 DB X |

*Primary Examiner*—C. J. Husar
*Assistant Examiner*—Ira S. Lazarus
*Attorney, Agent, or Firm*—Harold W. Adams; Auzville Jackson, Jr.

[57] ABSTRACT

This is a valve for controlling the flow of fuel to an internal combustion engine in response to engine coolant temperature thereby preventing engine operation at full load above a selected coolant temperature.

2 Claims, 4 Drawing Figures

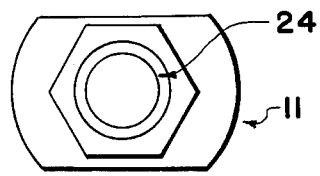
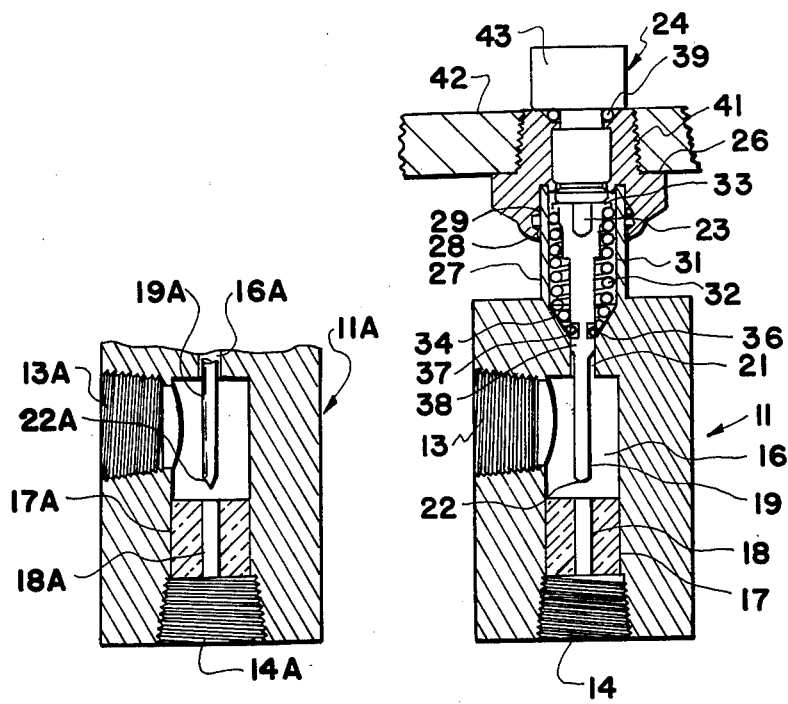
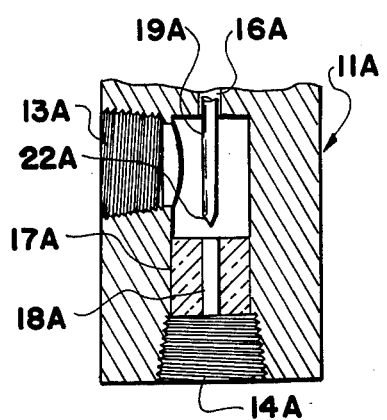
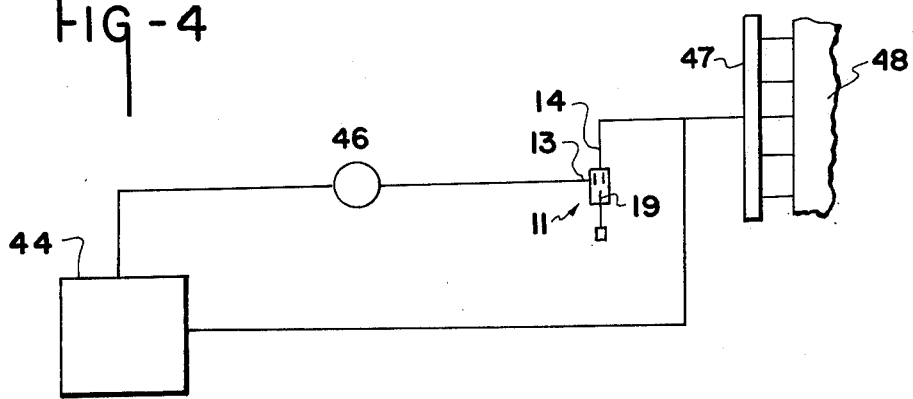

FUEL VALVES

BACKGROUND OF THE INVENTION

Valves responsive to the manifold vacuum and engine torque of internal combustion engines in vehicles are known, for instance see U.S. Pats. No. 2,895,561 and 2,926,892 as representative of the prior art. Generally such devices are principally concerned with improved combustion efficiency and lower emission pollutant levels in the exhaust gases of an internal combustion engine rather than the noise created by its operation.

Conventionally, for instance, in designing heavy duty, truck-type diesel, or compression ignition type internal combustion engines, the cooling system, including the fan and radiator are sized to accommodate the amount of heat dissipated with the engine operating at maximum load at at maximum expected ambient temperature. During such operation the fan is operated at maximum speed which is an undesired source of noise and of concern to those charged with the protection of the environment. Further, since the engine may be operated at full load at abnormally high coolant temperatures, it is subject to damage under such operating conditions.

SUMMARY OF THE INVENTION

This invention overcomes the aforementioned disadvantages of conventional internal combustion engines and cooling systems therefor and is summarized as a temperature responsive fuel supply valve for selectively restricting the flow of fuel to a pressure ignition type internal combustion engine at a determined high temperature of the engine coolant.

Since the engine is prevented from operating at full or rated load due to the reduction in fuel supplied under conditions of high coolant temperatures for which the cooling system would otherwise normally be designed, both the size of the radiator and fan speed can be substantially reduced thus lowering the level of engine noise and preventing its operation under abnormal load and coolant temperature conditions.

The valve may be installed in the fuel line between the fuel pump and fuel injector and sized to restrict the flow of fuel as required to achieve the desired reduction in engine torque or output beginning at a determined temperature and over a selected temperature range as desired.

BRIEF DESCRIPTION OF THE DRAWING

FIG. 1 is a cross-sectional view illustrating a preferred embodiment of a temperature responsive fuel control valve in accordance with the principles of the invention;

FIG. 2 is a plan view of the preferred embodiment shown in FIG.

FIG. 3 is a schematic illustrating the invention installed in the fuel line of a pressure ignition internal combustion engine; and FIG. 4 is a cross-sectional view illustrating an alternative embodiment of the invention showing a temperature responsive linear flow fuel control valve.

DESCRIPTION OF A PREFERRED EMBODIMENT

Referring to the drawing a preferred embodiment of a temperature responsive fuel valve generally designated by the reference numeral 11 is illustrated in FIGS. 1 and 2 as comprising a valve body or housing 12 having a threaded inlet 13 and a threaded outlet 14. Inlet 13 opens directly into an internal chamber 16 while outlet 14 communicates with the chamber 16 by way of a cylindrical brass sleeve 17 having a circular orifice 18, the longitudinal axis of which coincides with that of a reciprocable cylindrical plug 19 that extends into the chamber 16 through a passage 21.

Preferably the diameter of the plug 19 is slightly smaller than that of the orifice 18 with the tip 22 of the plug curved or otherwise formed to facilitate entry therein.

The plug 19 is fixedly secured to the reciprocable stem 23 of a conventional thermally responsive power element designated generally by reference numeral 24 such as a Power Pill, manufactured by the Fulton Sylphon Division, Robertshaw Controls Company, Knoxville, Tennessee. The power element 24 is supported in an externally threaded jacket 26 which also receives a hollow cylindrical projection 27 integrally formed on the valve housing 12, the leading edge 28 of the jacket 26 being crimped over a shoulder 29 on the projection 27 fixedly securing the two together. Projection 27 provides a cavity 31 that confines a spring 32 that operates against a shoulder 33 on the plug 19 holding the plug in the withdrawn position as shown in FIG. 2 in the absence of any force of expansion within the thermal element 24 exerted against the stem 22.

The mouth 34 of the passage 21 is beveled to provide a seat for the spring 32 while an O ring 36 fitted in a groove 37 in the slightly enlarged portion 38 of the plug 19 that passes through the passage 21 seals the chamber 16 from the cavity 31. O ring 39 prevents engine coolant from entering cavity 31 when the threaded end 41 of jacket 26 is threaded into the engine side wall 42 exposing the wax cup 43 of the thermal element 23 to engine coolant as shown in FIG. 2

In the operation of the invention when installed in a compression ignition internal combustion fuel supply system as shown in FIG. 3 the valve plug 19 remains withdrawn in the position as shown in FIG. 1 with engine coolant temperatures below those at which the cooling system is adequate to cool the cooling medium. Thus, fuel is free to pass without restriction from tank 44 to the fuel pump 46 through the inlet 13 and outlet 14 of valve 13 and fuel injectors 47 to the engine 48 which is operated at maximum rated torque or power output.

As the engine coolant begins to overheat, an elastomeric wax charge having a specific heat of expansion in the thermal element cup will expand as is well knwon pushing the stem 22 and thus the plug 19 into the orifice 18 reducing fuel flow to the injectors and thus the available output torque of the engine. Since rate and length of stroke of the stem can be controlled, the rate of restriction of fuel flow for a given stroke of the stem can also be controlled.

By properly configuring the end of plug 19 relative to the cylindrical orifice the rate of fuel flow restriction for a given stroke can be made either non-linear as shown or in FIG. 2 or linear as shown in FIG. 4 where the end 22A or plug 19A is conical in configuration.

In the preferred arrangement, shown in FIG. 2, the plug 19 is cylindrical and of slightly smaller diameter than the circular orifice and the tip rounded so that the amount of fuel flow restriction with the plug inserted in the orifice is a direct function of the difference in the respective diameters of the plug and orifice. The rate of fuel flow restriction while the plug approaches and is received within the orifice is non-linear relative to the plug travel or stroke. As the coolant temperature decreases to a lower and safe level below the selected valve the spring 32 returns the plug 19 to its original position again allowing unrestricted fuel flow through the valve and normal engine operation.

In practice the size of orifice is determined by the amount of fuel flow necessary for full rated engine load operation and is made slightly larger than is required. As noted the size and shape of both the plug and orifice determine the amount of fuel flow restriction for a given stem stroke.

One or both may be dimensioned to effect the reduction in engine torque desired for any given engine coolant temperature. Preferably, the diameter of portion 38 of the plug 19 received in passage 21 should be kept as small as possible in order that the fuel pressure in chamber 16 and which can be as high as 300 PSI will not exert excessive loading on the thermal element 23 which in turn may alter the temperature-stroke characteristics of the thermal element.

As an example, assume the fuel flow rate to diesel engine 48 must equal 0.38 gallons per minute at a pressure drop of 2 PSI in order to achieve a rated engine torque of 825 ft-pounds at 2300 rpm. Assume further an orifice diameter of 0.101 inches is required to provide the necessary fuel flow. To lower the engine noise level by reducing the fan speed and diameter while avoiding operation at or above rated load at excessive coolant temperatures with such an engine in accordance with the invention, the engine torque may be limited to 75% of its rated value or 619 ft-pounds at 2300 rpm at a maximum coolant temperature of 205° F.

By using a plug 19 having a diameter of 0.093 inches, a fuel flow rate of 0.06 gallons per minute at a pressure drop of 2 PSI. is maintained through the plug restricted orifice 18 to effect the desired reduction in engine output torque. In providing a temperature responsive fuel valve in accordance with the invention in a typical compression ignition internal combustion engine reduced up to 10% lowering the noise of operation.

While a preferred embodiment of the invention has been described in detail for use in a compression ignition engine fuel supply it is to be limited only by the scope of the appended claims.

What is claimed is:
1. In an internal combustion engine including means for supplying fuel to said engine in a fuel line and means for circulating a liquid coolant through said engine including a radiator and fan to dissipate the heat of combustion from said engine up to a rated torque output of said engine, a temperature responsive fuel supply valve comprising:
   a valve body having an inlet and an outlet connected in said fuel line, said inlet being transverse to said outlet;
   means in said valve forming an orifice in said outlet, said orifice providing a maximum metered flow of fuel through said valve at the rated torque output of said engine;
   a movable plug of smaller diameter than said orifice supported within said valve body and adapted for insertion into said orifice, the end of said movable plug received in said orifice being configured so as to maintain a linear relationship between the movement of said plug into said orifice and the resulting rate of fuel flow through said orifice;
   spring means for holding said movable plug clear of said orifice; and
   thermal power means including a displaceable stem operatively connected to said plug and responsive to said temperature of said coolant for inserting said plug into said orifice thereby linearly reducing the flow of fuel through said orifice to vary the maximum torque output of said engine thereby reducing the radiator fan speed.
2. A fuel supply valve as defined in claim 1 wherein the end of said plug inserted into said orifice is conical in configuration.

* * * * *